United States Patent Office 3,766,203
Patented Oct. 16, 1973

3,766,203
PROCESS FOR PREPARING IMIDAZOLINE COMPOUNDS
Setsujiro Sumida, Kawasaki, and Tomoyoshi Hachiya, Tokyo, Japan, assignors to Ajinomoto Co., Inc., Tokyo, Japan
No Drawing. Filed Dec. 27, 1971, Ser. No. 212,747
Claims priority, application Japan, Dec. 30, 1970, 46/128,718; May 31, 1971, 46/37,751
Int. Cl. C07d 49/34
U.S. Cl. 260—309.6                     10 Claims

ABSTRACT OF THE DISCLOSURE

Imidazoline compounds are prepared in high yield and in high purity by reacting a 1,2-diamine compound or an N-substituted 1,2-diamine compound with a nitrile compound in the presence of a catalytic amount of cysteine or cystine.

BACKGROUND OF THE INVENTION

Field of the invention

The present invention relates to an improved process for preparing imidazoline compounds by the reaction of a 1,2-diamine compound or an N-substituted 1,2-diamine compound and a nitrile compound.

Description of the prior art

Imidazoline compounds are known to be useful as surfactants, emulsifiers, fiber softening agents, felting agents, cleaning agents for use in hard or soft water, acidic or alkaline solutions and for highly concentrated electrolytic solutions, anticorrosive agents, additives for petroleum products, and for floatation agents. They are also known as being useful intermediates for the preparation of medicinals and for the preparation of agricultural chemicals.

Conventionally, imidazoline compounds have been prepared by reacting a 1,2-diamine compound with a nitrile compound utilizing the catalytic effect of sulfur or hydrogen sulfide. For instance, several publications have reported that this reaction may be conducted in the presence of sulfur, or compounds which are capable of generating sulfur by heating, such as phosphorous penta-sulfide or sulfur chloride, or in the presence of hydrogen sulfide or compounds capable of generating hydrogen sulfide by heating (see Japanese patent publications Nos. 24,965/64, 8,354/65, and 1,548/67). However, those processes generally suffer the disadvantage that the reaction mixture is colored with these sulfur compounds. Moreover, even if the product is separated from the reaction mixture by ordinary techniques, such as distillation, recrystallization or sublimation, some degree of sulfur contamination in the product is almost unavoidable. To completely desulfurize the product, it has been necessary to heat the reaction mixture with a small amount of metallic zinc or iron in order to convert the sulfur to the corresponding sulfide which can then be removed by filtration.

It has also been reported that imidazoline compounds can be directly prepared by reacting an N-substituted 1,2-diamine compound, such as diethylenetriamine or triethylenetetramine with a nitrile compound while heating (Belgian Pat. No. 663,324), or by reacting an N-substituted 1,2-diamine, such as those mentioned above, with a higher carboxylic acid while heating (Japanese patent publication No. 12,552/62). However, neither of these processes are industrially attractive because of the severe reaction conditions required, i.e., they must be carried out at elevated temperatures, such as above 200° C., and in a pressure vessel, such as an autoclave, and because the resulting product yield is rather low.

A need exists, therefore, for a method of directly producing high purity imidazoline compounds in high yields and under moderate reaction conditions.

SUMMARY OF THE INVENTION

Accordingly, it is one object of this invention to provide a direct method of preparing high purity imidazoline compounds.

It is another object of this invention to provide an industrially desirable method for producing imidazoline compounds in high yields.

These and other objects as will hereinafter become more readily apparent, have now been achieved by the discovery that cysteine or cystine have high degrees of catalytic activity for the reaction of a 1,2-diamine compound, or an N-substituted, 1,2-diamine compound with a nitrile compound, in the preparation of imidazoline compounds.

DETAILED DESCRIPTION OF THE INVENTION

It has been found that when the reaction of the 1,2-diamine compound or the N-substituted 1,2-diamine compound with nitrile compound in the presence of the sulfur containing amino acids, cysteine or cystine, the reaction will proceed at relatively low temperatures and normal atmospheric pressure, and will be complete within a relatively short period of time. The resulting reaction mixture is essentially free, or contains no detectable coloration, so that the desired imidazoline compounds will be obtained in high purity and in high yields merely by subjecting the reaction mixture to such conventional purification procedures as distillation, recrystallization or sublimation.

It is believed that the reaction proceeds according to either of the general reaction schematics (I) or (II), depending upon the number of nitrile groups present:

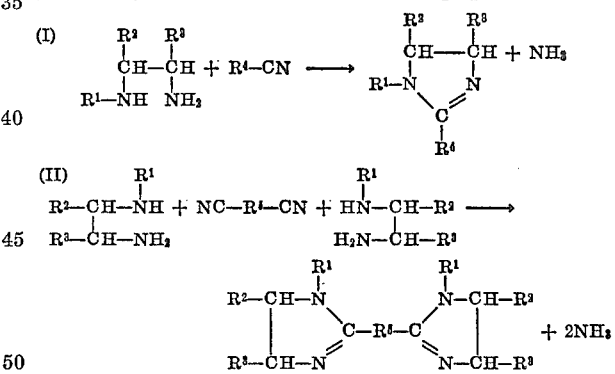

wherein $R^1$ represents hydrogen, an alkyl group having from 8 to 18 carbon atoms, an aryl group, an alkenyl group having from 3 to 18 carbon atoms,

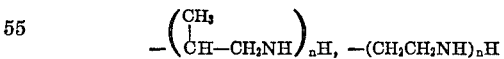

wherein $n$ is an integer of from 1 to 5, an aminoalkyl group having from 1 to 4 carbon atoms, or a hydroxyalkyl group having from 1 to 4 carbon atoms. $R^2$, $R^3$ each represent hydrogen, an alkyl or an aryl group, respectively, $R^4$ represents an alkyl group having from 1 to 17 carbon atoms, an alkenyl group having from 4 to 17 carbon atoms, a cycloalkyl group or an aryl group; $R^5$ represents an alkylene group having from 1 to 5 carbon atoms, an arylene group or a heterocyclic group.

It has been experimentally determined that cysteine and cystine exhibit a far greater effect than any other sulfur or hydrogen sulfide generating compound. In fact, they are not only more effective than such other compounds as tetramethylthiurammonosulfide, mercaptobenzothiazole, benzyl mercaptan, tertiary hexyl mercaptan, allyl sulfide, benzylsulfide, allylisothiocyanate, dibenzothiazildisulfide, zinc di-n-butyldithiocarbamate, 2-mercaptoimidazoline, thioglycol and the like, they even exhibit far greater catalytic effect than similar sulfur containing amino acids, such as methionine and homocysteic acid.

Table I below shows a comparison between the same reaction conducted under the same conditions except using a sulfur catalyst, and using the catalysts of the present invention. The reactions were conducted by heating a mixture of 0.5 mole 1,2-propylene diamine and 0.5 mole of propionitrile at a temperature of 97° C. for a time as indicated in the table, in the presence of 0.003 mole of the respective catalysts.

The yield of 2-ethyl-4-methyl-2-imidazoline obtained is shown.

TABLE I

| Catalyst | Reaction time (hour) | Appearance of the reaction mixture | Yield (percent) |
|---|---|---|---|
| Sulfur | 22 | Blue | 39.8 |
| Cystine | 6 | Colorless | 50.5 |
| Cystein hydrochloridemonohydrate | 6 | do | 83 |

Table II below illustrates the yield of 1-(2-aminoethyl)-2-imidazoline obtained by the reaction of 0.3 mole of diethylenetriamine and 0.3 mole of propionitrile at a temperature and for a time as indicated in the table, in the presence of 0.015 mole of the catalysts of this invention and in the absence of catalysts.

TABLE II

| Catalyst | Temp. (° C.) | Time (hour) | Yield (percent) |
|---|---|---|---|
| Cysteine hydrochloride monohydrate | 97 | 5 | 98. |
| Cystine | 97 | 5 | 87.8 |
| None | 97 | 24 | 0 |
| None* | 260–300 | 7 | 71.2 |

*The reaction was conducted in 100 ml. autoclave.

The results reported in Tables I and II, clearly show that cysteine and cystine have a superior catalytic activity as compared with the use of sulfur, and they provide much superior results as compared with the use of no catalyst. Moreover, it was also found that the reaction mixture was free of coloration and provided a high yield at relatively moderate reaction conditions.

Any 1,2-diamine compound or N-substituted 1,2-diamine compound may be used in the subject reaction. For instance, suitable 1,2-diamine compounds, include ethylenediamine and propylene-1,2-diamine. Suitable N-substituted diamine compounds include N-aminoalkyl ethylenediamines, such as diethylenetriamine, triethylenetetramine, tetraethylenepentamine, dipropylenediamine, tripropylenetetramine and tetrapropylenepentamine; N-hydroxyalkyl ethylenediamine, such as N-2-hydroxyethyl ethylenediamine; N-alkylethylenediamines, such as N-octylethylenediamine, N-decylethylenediamine and N-octadecylethylenediamine; N - alkenylethylenediamine, such as N-allylethylenediamine, and N-arylethylenediamine.

The nitrile compound used herein may be either an aliphatic nitrile or an aromatic nitrile. For instance, suitable aliphatic nitrile compounds include acetonitrile, propionitrile, butyronitrile, glutaronitrile, adiponitrile, 3,9-bis (cyanoethyl)-2,4,8,10-tetroxospiro [5.5] undecane, or the like. Suitable aromatic nitrile compounds include benzonitrile, para-tolunitrile, meta-tolunitrile, 1,4-phthalonitrile, 1,3-phthalonitrile or the like.

The cysteine or cystine catalysts used herein may be in the form of their free amino acids, or their mineral acid addition salts, such as hydrochloride, hydrobromide and sulfate. The amount of the catalyst used is not particularly limited, but in general from 0.005 mole to 0.1 mole of cysteine or cystine per mole of 1,2-diamine compound is sufficient.

The reaction may be carried out at room temperature in the presence or absence of an inert solvent, but it is preferable to carry out the reaction at temperatures ranging from 50° C. to the reflux temperature under normal atmospheric pressure.

The procedure for isolating the desired imidazoline compounds from the reaction mixture is very simple, since no, or almost no, coloration is detected in the reaction mixture, and almost no byproduct formation is found to occur. To separate the product, for example, the conventional means of distillation, crystallization or sublimation may be used according to the particular properties or characteristics of the product to be isolated. Thus, according to the present invention, the use of high temperatures and pressures can be avoided, the purification procedure for isolation of the product may be simplified, and the achievable yield can be from 70% to almost quantitative.

Having generally described the invention, a further understanding can be obtained by reference to certain specific examples which are included herein for purposes of illustration only and are not intended to be limiting unless otherwise specified.

EXAMPLE 1

2.6 g. of cysteine hydrochloride monohydrate was added to a mixture of 12.3 g. of acetonitrile and 18.0 of ethylenediamine, which had been allowed to stand overnight with sodium hydroxide, and then filtered and dried. The mixture was heated under reflux for 30 minutes over a waterbath, and the resultant reaction mixture was allowed to cool in air. The precipitated crystals formed were filtered and recrystallized from benzene, and 22.3 g. of 2-methyl-2-imidazoline was obtained. The yield, based on ethylenediamine: 88.4%, melting point: 102–103° C.

EXAMPLE 2

2.6 g. of cysteine hydrochloride monohydrate was added to a mixture of 18.0 g. ethylenediamine and 14.9 g. of propionitrile and the mixture was heated for 1 hour according to Example 1. The resultant reaction solution was fractionally distilled under reduced pressure to yield 23.8 g. of 2-ethyl-2-imidazoline. Yield: 81%, B.P.: 90–93° C./12 mm. Hg. This distillate crystallized spontaneously.

EXAMPLE 3

2.6 g. of cysteine hydrochloride monohydrate was added to a mixture of 20.0 g. of 1,2-propylenediamine and 12.3 g. of acetonitrile and reacted for 1 hour according to Example 1. Thereafter, the reaction mixture was distilled under reduced pressure to yield 23.8 g. of 2,4-dimethyl-2-imidazoline. Yield: 81.0%, B.P. 104–106° C./25 mm. Hg.

EXAMPLE 4

0.5 g. of cysteine hydrochloride monohydrate was added to a mixture of 28.0 g. of 1,2-propylenediamine and 37.0 g. of propionitrile and then was reacted for 8 hours according to Example 1. The reaction solution was distilled to yield 45.9 g. of 2-ethyl-4-methyl-2-imidazoline. Yield: 82.0%, B.P.: 105–107° C./16 mm. Hg.

EXAMPLE 5

2.6 g. of cysteine hydrochloride monohydrate was added to a mixture of 18.0 g. of ethylenediamine and 30.9 g. of benzonitrile, and then was reacted at 100° C. for 2 hours. The reaction solution was cooled on standing and the precipitated crystals were filtered and recrystallized from toluene. 37 g. of 2-phenyl-2-imidazoline was obtained. Yield: 84.9%, M.P.: 102–103° C.

EXAMPLE 6

2.6 g. of cysteine hydrochloride monohydrate was added to a mixture of 18.0 g. of ethylenediamine and 35.1 g. of para-tolunitrile and then was reacted at 100° C. for 2.5 hours. The reaction solution was cooled on standing and the precipitated crystals were filtered and recrystallized from methanol and acetone. There was obtained 41.6 g. of 2-para-tolyl-2-imidazoline. Yield: 86.7%, B.P.: 179–180° C.

EXAMPLE 7

2.6 g. of cysteine hydrochloride monohydride was added to a mixture of 18.0 g. of ethylenediamine and 35.1 g. of meta-tolunitrile, and then was reacted at 100° C. for 4.5 hours. The resultant reaction solution was distilled under reduced pressure to yield 40.0 g. of 2-meta-tolyl-2-imidazoline. Yield: 83.3%, B.P.: 125–127° C./0.05 mm. Hg.

EXAMPLE 8

2.6 g. of cysteine hydrochloride monohydrate was added to a mixture of 20.0 g. of 1,2-propylenediamine and 30.9 g. of benzonitrile, and then was heated at 100° C. for 3 hours. The reaction solution was distilled under reduced pressure to yield 40.3 g. of 2-phenyl-4-methyl-2-imidazoline. Yield: 84.0%, B.P.: 131–133° C./0.8 mm. Hg. This distillate was turned into crystals immediately after distillation.

EXAMPLE 9

2.6 g. of cysteine hydrochloride monohydrate was added to a mixture of 20.0 g. 1,2-propylenediamine and 35.1 g. of para-tolunitrile, and then heated at 100° C. for 4.5 hours. The reaction solution was distilled under reduced pressure to yield 137.7 g. of 2-para-tolyl-4-methyl-2-imidazoline. Yield: 78.5%, B.P.: 120–121° C./0.001 mm. Hg.

EXAMPLE 10

2.6 g. of cysteine hydrochloride monohydrate was added to a mixture of 36.0 g. ethylenediamine and 32.4 g. adiponitrile and then reacted for 3 hours according to Example 1. The reaction solution was cooled on standing and the precipitated crystals were filtered and recrystallized from a methanol-acetone mixture. There was obtained 48.3 g. of 1,4-di-[imidazolinyl-(2)]-butane. Yield: 78.9%, M.P.: 215–216° C.

EXAMPLE 11

2.6 g. of cysteine hydrochloride monohydrate was added to a mixture of 20.0 g. of 1,2-propylenediamine and 35.1 g. of meta-tolunitrile, and then heated at 100° C. for 4.5 hours. The reaction solution was distilled under reduced pressure to yield 38.5 g. of 2-metatolyl-4-methyl-2-imidazoline. Yield: 80.2%, B.P.: 123–125° C./0.03 mm. Hg.

EXAMPLE 12

2.6 g. of cysteine hydrochloride monohydrate was added to a mixture of 40.0 g. of propylenediamine and 32.4 g. of adiponitrile and then reacted for 6 hours according to Example 1. After cooling, the precipitated crystals were filtered and recrystallized from acetone. There was obtained 51.3 g. of 1,4-di-[4-methylimidazolinyl-(2)]-butane. Yield: 77.0%, M.P.: 112–113° C.

EXAMPLE 13

2.6 g. of cysteine hydrochloride monohydrate was added to a mixture of 36.0 g. of ethylenediamine and 38.4 g. of telephthalonitrile, and then reacted for 6 hours according to Example 6. After cooling upon standing, the precipitated crystals were filtered and recrystallized from dimethylformamide. There was obtained 42.3 g. of 1,4-di-[imidazolinyl-(2)]-benzole. Yield: 58.3%, M.P.: 296–297° C.

EXAMPLE 14

2.6 g. of cysteine hydrochloride monohydrate was added to a mixture of 36.0 g. of ethylenediamine and 38.4 g. of 1,3-phthalonitrile, and then reacted for 6 hours according to Example 6. After cooling on standing, the precipitated crystals were filtered and recrystallized from methanol. There was obtained 48.3 g. of 1,3-di-[imidazolinyl-(2)]-benzole. Yield: 66.6%, M.P.: 242–243° C.

EXAMPLE 15

2.6 g. of cysteine hydrochloride monohydrate was added to a mixture of 40.0 g. of 1,2-propylenediamine and 38.4 g. of telephthalonitrile, and then reacted for 3.5 hours according to Example 5. The obtained crystals were recrystallized from ethanol. There was obtained 45.2 g. of 1,3 - di - [4 - methyl-imidazolinyl-(2)]-benzole. Yield: 55.8%, M.P.: 226° C.

EXAMPLE 16

3.6 g. of cystine was added to a mixture of 20.0 g. of 1,2-propylenediamine and 14.9 g. of propionitrile, and then reacted to for 10 hours according to Example 1. The reaction solution was distilled under reduced pressure to yield 25.3 g. of 2-ethyl-4-methyl-imidazoline. Yield: 75.3%, B.P.: 105–107° C./16 mm. Hg.

EXAMPLE 17

10.0 g. of cysteine hydrochloride monohydrate was added to a mixture of 206.0 g. of diethylenetriamine and 110.0 g. of propionitrile, and then heated under reflux for 5 hours on a water-bath. The resultant reaction solution was distilled under pressure to yield 273.5 g. of 1-(2-amino-ethyl)-2-ethyl-2-imidazoline. Yield: 97.0%, B.P.: 146° C./39 mm. Hg colorless liquid.

EXAMPLE 18

2.0 g. of cysteine hydrochloride monohydrate was added to a mixture of 170.0 g. of triethylenetetramine and 64.4 g. of propionitrile, and then reacted for 5 hours according to Example 17. The reaciton solution was distilled under reduced pressure to yield 194.7 g. of 1-{2-[(2-aminoethyl)amino]ethyl}-2-ethyl-2-imidazoline. Yield: 91.7% based on triethylenetetramine, colorless liquid, B.P.: 198° C./15 mm. Hg.

EXAMPLE 19

0.6 g. of cysteine hydrochloride monohydrate was added to a mixture of 56.7 g. of tetraethylenepentamine and 16.5 g. of propionitrile, and then reacted for 4 hours according to Example 17. The reaction solution was distilled under reduced pressure to yield 55.3 g. of 1-{2-[(2-[(2-aminoethyl)amino]ethyl) amino]ethyl} - 2-ethyl-2-imidazoline. The yield, based on tetraethylenepentamine: 81.2%, colorless liquid, B.P. 150–159° C./0.08 mm. Hg.

EXAMPLE 20

0.7 g. of cysteine hydrochloride monohydrate was added to a mixture of 58.4 g. of triethylenetetramine and 16.4 g. of acetonitrile, and then reacted for 4 hours according to Example 17. The reaction solution was distilled under reduced pressure to yield 56.4 g. of 1-(2-[(2-aminoethyl)amino]ethyl) - 2-methyl-2-imidazoline. The yield was 82.9%, based on triethylenetetramine. Colorless liquid, B.P. 230° C./20 mm. Hg.

EXAMPLE 21

0.6 g. of cysteine hyrochloride monohydrate was added to a mixture of 30.9 g. of diethylenetriamine and 30.9 g. of benzonitrile, and then reacted at 120° C. for 4 hours. The reaction solution was distilled under reduced pressure to yield 57.4 g. of 1-(2-aminoethyl)-2-phenyl-2-imidazoline. The yield was 71.3%, based on the diethylenetriamine. Colorless liquid, B.P.: 134° C./0.6 mm. Hg.

EXAMPLE 22

0.7 g. of cysteine hydrochloride monohydrate was added to a mixture of 41.6 g. of N-2-hydroxyethyl-ethylenediamine and 22.0 g. of propionitrile, and then reacted at 120° C. for 4 hours. The reaction solution was distilled under reduced presure to yield 52.3 g. of 1-(2-hydroxyethyl) - 2 - ethyl-2-imidazoline. The yield, based on the amine: 92.0%, colorless liquid, B.P.: 132° C./1.3 mm. Hg.

EXAMPLE 23

0.4 g. of cysteine hydrochloride monohydrate was added to a mixture of 40.0 g. of N-octyl ethylenediamine and 12.7 g. of propionitrile, and then reacted at 120° C. for 7 hours. The reaction solution was distilled under reduced pressure to yield 44.6 g. of 1-octyl-2-ethyl-2-imidazoline. The yield, based on the amine: 92.4%, colorless liquid, B.P.: 153–157° C./mm. Hg.

EXAMPLE 24

The procedure of Example 23 was repeated except that N-octadecyl-ethylenediamine was employed in place of N-octylethylenediamine. There was obtained 1-octadecyl-2-ethyl-2-imidazoline. Yield: 90.3%.

EXAMPLE 25

0.7 g. of cysteine hydrochloride monohydrate was added to a mixture of 40.0 g. of N-allyl-ethylenediamine and 22.0 g. of propionitrile, and then reacted at 120° C. for 5 hours. The reaction solution was distilled under reduced pressure to yield 38.9 g. of 1-allyl-2-ethyl-2-imidazoline. The yield, based on the amine: 70.5, colorless liquid, B.P.: 96° C./17 mm. Hg.

EXAMPLE 26

1.0 g. of cysteine hydrochloride monohydrate was added to a mixture of 31.0 g. of diethylenetriamine and 40.0 g. of n-octadecanonitrile, and then was reacted at 150° C. for 6 hours. The reaction solution was distilled under reduced pressure to yield 73.9 g. of 1-(2-aminoethyl)-2-n-heptadecanyl-2-imidazoline. The yield, based on the amine: 70.2%, B.P.: 204° C./20 mm. Hg. This product solidified to white crystals immediately after distillation.

EXAMPLE 27

1.0 g. of cysteine hydrochloride monohydrate was added to a mixture of 41.2 g. of diethylenetriamine and 21.6 g. of adiponitrile, and then was reacted at 120° C. for 6 hours. The reaction solution was distilled under reduced pressure to yield 46.1 g. of 1,4-di-[1-(2-aminoethyl)-imidazolinyl-(2)]-butane. The yield based on the amine: 82.3%, B.P.: 172° C./1.0 mm. Hg. This product crystallized easily. M.P.: 142–160° C. (dec.).

EXAMPLE 28

1.0 g. of cysteine hydrochloride monohydrate was added to a mixture of 41.2 g. of diethylenetriamine and 25.6 g. of telephthalonitrile, and then was reacted at 120° C. for 6 hours. The obtained crystals were dissolved in benzene and hexane was added thereto for recrystallization. There was obtained 49.0 g. of white crystals of 1,4 - di[1 - (2-aminoethyl)imidazolinyl-(2)]benzole. The yield, based on the amine: 81.7%, M.P.: 234° C.

EXAMPLE 29

0.5 g. of cysteine was added to a mixture of 30.9 g. of diethylenetriamine and 14.9 g. of propionitrile, and then reacted for 1 hour according to Example 1. The reaction solution was distilled under reduced pressure to yield 38.6 g. of 1-(2-aminoethyl)-2-ethyl-2-imidazoline. The yield, based on the amine was 91.2%.

Having now fully described the invention, it will now be apparent to one of ordinary skill in the art that many changes and modifications can be made thereto without departing from the spirit or scope of the invention.

Accordingly, what is claimed as new and desired to be secured by Letters Patent is:

1. In a process for preparing an imidazoline compound by reacting a compound from the group consisting of 1,2-diamine compound and N-substituted, 1,2-diamine compound with a nitrile compound, the improvement which comprises effecting said reaction in the presence of a catalytic amount of cysteine.

2. The process of claim 1, wherein said cysteine or cystine is in the form of a mineral acid addition salt.

3. The process of claim 2, wherein said cysteine or cystine is in the form of its hydrochloride addition salt.

4. In a process for preparing an imidazoline compound which comprises reacting a compound selected from the group consisting of 1,2-diamine compound and N-substituted 1,2-diamine compound with a nitrile compound the improvement which comprises effecting said reaction at a temperature of from 50° C. to the reflux temperature under normal atmospheric pressure in the presence of a catalytic amount of cysteine.

5. The process of claim 4, wherein the molar ratio of cysteine or cystine to the 1,2-diamine compound or the N-substituted 1,2-diamine compound is between 0.005 and 0.1:1.

6. The process of claim 4, wherein the 1,2-diamine compound is selected from the group consisting of ethylenediamine and propylenediamine.

7. The process of claim 4, wherein the N-substituted 1,2-diamine compound is selected from the group consisting of N-aminoalkylethylenediamine, N-hydroxyalkylethylenediamine, N-alkylethylenediamine, N-alkenylethylenediamine and N-arylethylenediamine.

8. The process of claim 4, wherein the nitrile compound is an aliphatic nitrile having from 2 to 18 carbon atoms or an aromatic nitrile.

9. The process of claim 8, wherein the aliphatic nitrile is selected from the group consisting of acetonitrile, propionitrile, butyronitrile, glucoronitrile, adiponitrile and 3,9-bis(cyanoethyl)-2,4,8,10-tetroxospiro-[5.5]undecane.

10. The process of claim 8, wherein the aromatic nitrile is selected from the group consisting of benzonitrile, para-tolunitrile, meta-tolunitrile, 1,4-phthalonitrile and 1,3-phthalonitrile.

References Cited

UNITED STATES PATENTS

| | | | |
|---|---|---|---|
| 3,210,371 | 10/1965 | Sawa et al. | 260—309.6 |
| 3,657,229 | 4/1972 | Bailey | 260—239 BC |

OTHER REFERENCES

Mecchi et al.: J. Food Sci. 29(4), 393–9 (1964).

HENRY R. JILES, Primary Examiner

G. T. TODD, Assistant Examiner